United States Patent
Perrin

(10) Patent No.: US 6,649,917 B2
(45) Date of Patent: Nov. 18, 2003

(54) CLEANING SYSTEM FOR UV DISINFECTION MODULE/REACTOR

(75) Inventor: Didier Perrin, Richmond, VA (US)

(73) Assignee: Ondeo Degremont, Richmond, VA (US)

( * ) Notice: Subject to any disclaimer, the term of this patent is extended or adjusted under 35 U.S.C. 154(b) by 0 days.

(21) Appl. No.: 09/867,776

(22) Filed: May 30, 2001

(65) Prior Publication Data

US 2002/0179847 A1 Dec. 5, 2002

(51) Int. Cl.$^7$ .............................................. G01N 21/01
(52) U.S. Cl. .................. 250/435; 250/436; 250/455.11; 250/430; 250/432; 422/24; 21/54 R; 21/DIG. 2; 21/102 R; 210/64
(58) Field of Search ................................. 250/435, 436, 250/455.11, 430, 432, 431; 422/24; 21/54 R, DIG. 2, 102 R; 210/64

(56) References Cited

U.S. PATENT DOCUMENTS

| | | |
|---|---|---|
| 3,562,520 A | 2/1971 | Hippen |
| 3,837,800 A | 9/1974 | Wood |
| 3,904,363 A | 9/1975 | Free |
| 4,017,734 A | 4/1977 | Ross |
| 4,367,410 A | 1/1983 | Wood |
| 4,968,489 A | 11/1990 | Peterson |
| 5,133,945 A | 7/1992 | Hallett |
| 5,418,370 A | * 5/1995 | Maarschalkerweerd ..... 250/431 |
| 5,440,131 A | * 8/1995 | Hutchison et al. .......... 250/435 |
| 5,528,044 A | * 6/1996 | Hutchison .................... 250/431 |
| 6,432,213 B2 | * 8/2002 | Wang et al. .................... 134/6 |

FOREIGN PATENT DOCUMENTS

| | | |
|---|---|---|
| DE | 38 35 571 | 2/1980 |
| DE | 37 10250 A1 | 10/1988 |
| EP | 0 811 578 A3 | 9/1998 |
| EP | 1 038 835 A1 | 9/2000 |

* cited by examiner

Primary Examiner—John H. Lee
Assistant Examiner—Zia R. Hashmi
(74) Attorney, Agent, or Firm—Piper Rudnick LLP

(57) ABSTRACT

A cleaning system for a UV disinfection module having a pair of headers with a multiplicity of lamps extending therebetween including a cleaning plate having a multiplicity of openings therein, the openings having lamp wipers and arranged to substantially coincide with positions of the lamps to permit movement of the plate between the headers, a rotatable screw extending between the headers and through the plate, a motor operatively connected to rotate the screw, a screw adapter fixed to the cleaning plate at a rotatable screw opening in the plate and including a substantially cylindrical tube having opposed openings, one of the openings being aligned with the rotatable screw opening and a thread nut connected to each of the opposed openings, each opposed opening having a threaded central bore sized to threadingly engage threads on the rotatable screw, whereby rotation of the screw moves the cleaning plate between the headers.

23 Claims, 7 Drawing Sheets

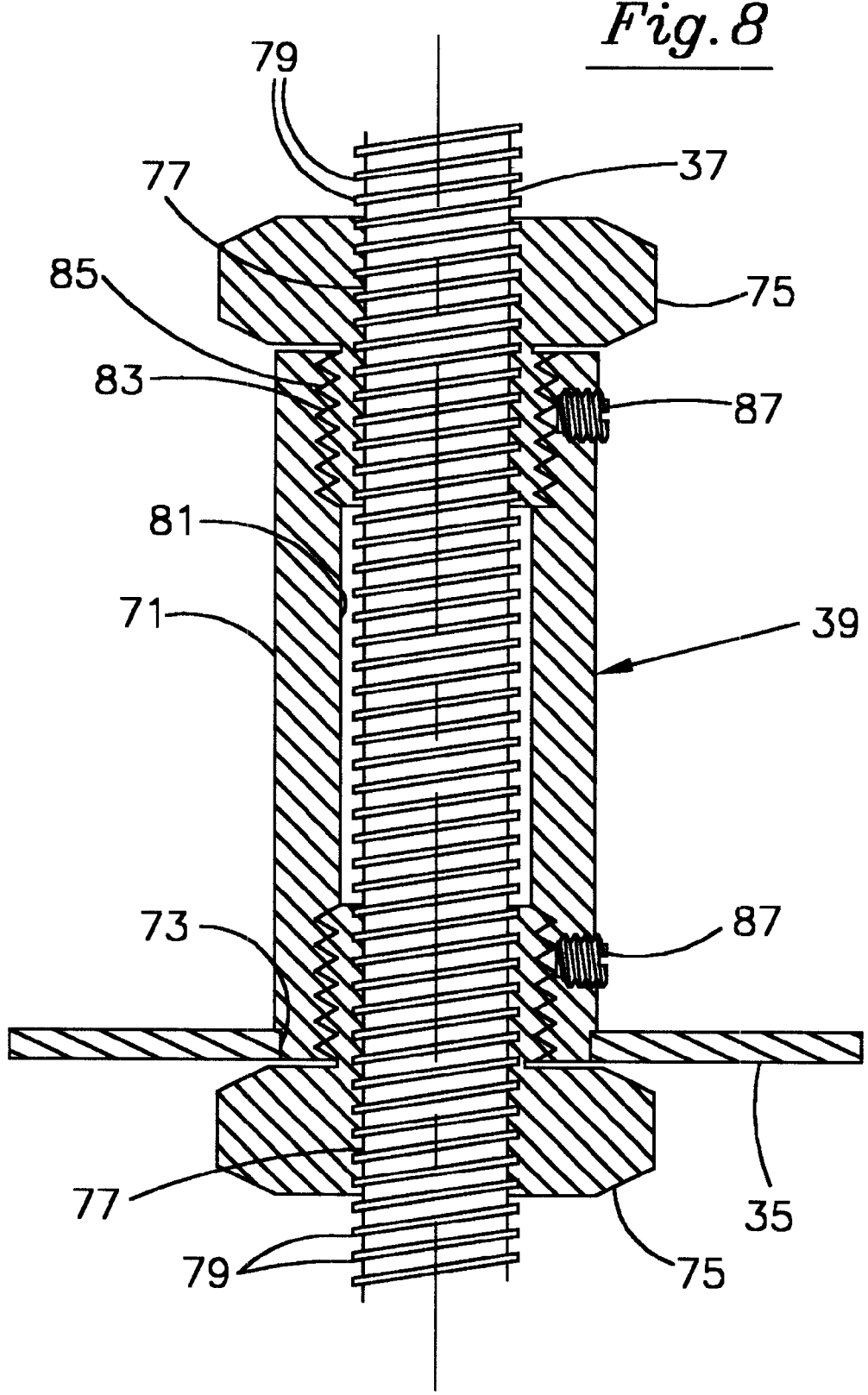

CLEANING SYSTEM FOR UV DISINFECTION MODULE/REACTOR

FIELD OF THE INVENTION

This invention relates to cleaning systems for UV disinfection modules/reactors, particularly to a moveable wiper system adapted for UV disinfection modules/reactors containing multiple UV disinfection lamps.

BACKGROUND

Utilization of UV for disinfection of potable and wastewater continues to increase on an ongoing basis. A number of UV disinfection systems are commercially available and utilized for a wide variety of wastewater and potable disinfection processes.

It has been an ongoing problem in the field of UV disinfection that, over the course of time, quartz jackets surrounding the individual UV lamps tend to foul due to the slow build-up or accumulation of deposited material on the quartz jackets. Such materials include particulates, fats, oils, greases and the like that are typical of foreign matter contained within the water being disinfected. A number of systems and processes have been developed to remove such accumulations/deposits. Such systems include various reciprocating wiper systems which tend to have one problem or another in effectively and economically achieving the task of cleaning quartz jackets for extended periods of time. Systems/processes known to the Applicant include U.S. Pat. Nos. 3,562,520; 3,837,800; 3,904,363; 4,017,734; 4,968,489; 5,133,945; 5,440,131; and 5,528,044.

SUMMARY OF THE INVENTION

This invention relates to a cleaning system for a UV disinfection module having a pair of headers with a multiplicity of lamps extending therebetween including a cleaning plate having a multiplicity of openings therein, the openings having lamp wipers and arranged to substantially coincide with positions of the lamps to permit movement of the plate between the headers, a rotatable screw extending between the headers and through the plate, a motor operatively connected to rotate the screw, a screw adapter fixed to the cleaning plate at a rotatable screw opening in the plate and including a substantially cylindrical tube having opposed openings, one of the openings being aligned with the rotatable screw opening and a thread nut connected to each of the opposed openings, each opposed opening having a threaded central bore sized to threadingly engage threads on the rotatable screw, whereby rotation of the screw moves the cleaning plate between the headers.

The invention also relates to a cleaning plate having a multiplicity of openings therein, the openings arranged to substantially coincide with positions of the lamps to permit sliding of the plate between the headers, a ring-shaped wiper connected to the plate at each opening sized such that each wiper has a diameter less than the exterior diameter of a corresponding lamp, each wiper connected to the plate which permits lateral movement of the wiper with respect to the plate, and a motor operatively connected to move the plate between the headers.

BRIEF DESCRIPTION OF THE DRAWINGS

FIG. 8 is an exploded cross-sectional view of a screw adapter taken from phantom line VIII of FIG. 5.

DETAILED DESCRIPTION

Figure 1:
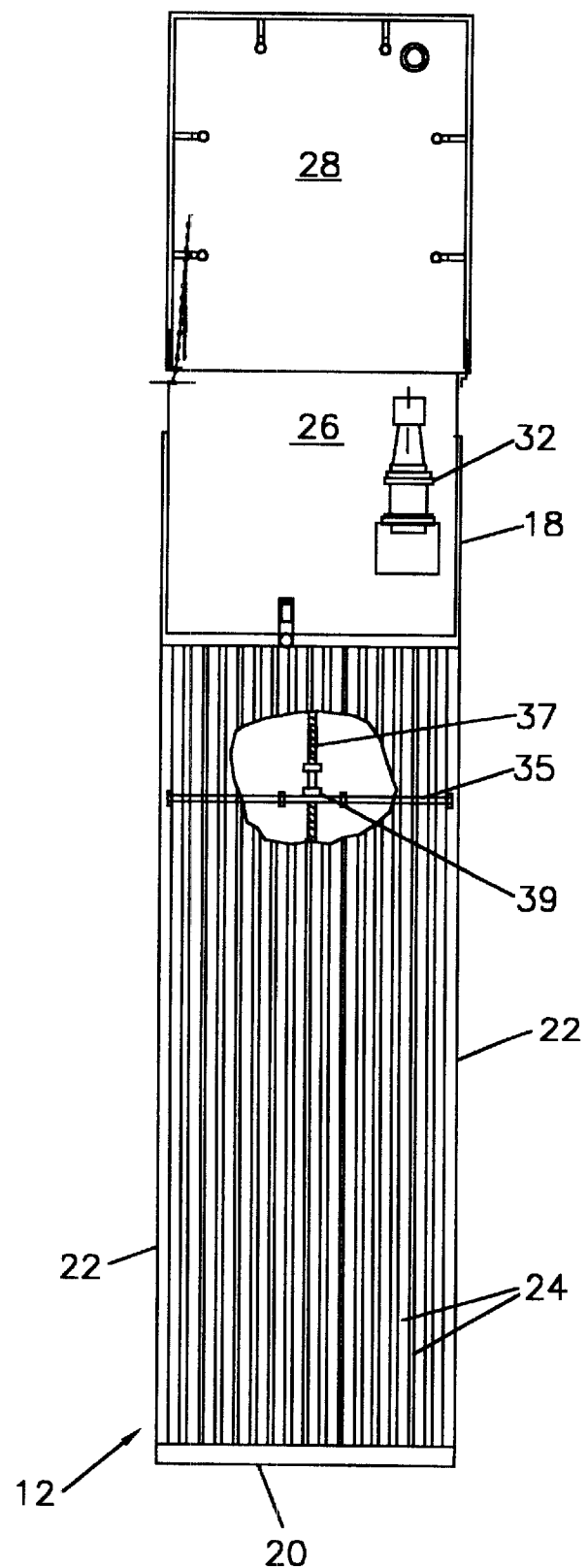
FIG. 1 is a front elevational view of a vertical UV disinfection module, having a portion broken away to facilitate ease of viewing of a cleaning system in accordance with aspects of the invention.

It will be appreciated that the following description is intended to refer to specific embodiments of the invention selected for illustration in the drawings and is not intended to define or limit the invention, other than in the appended claims.

Figure 2:
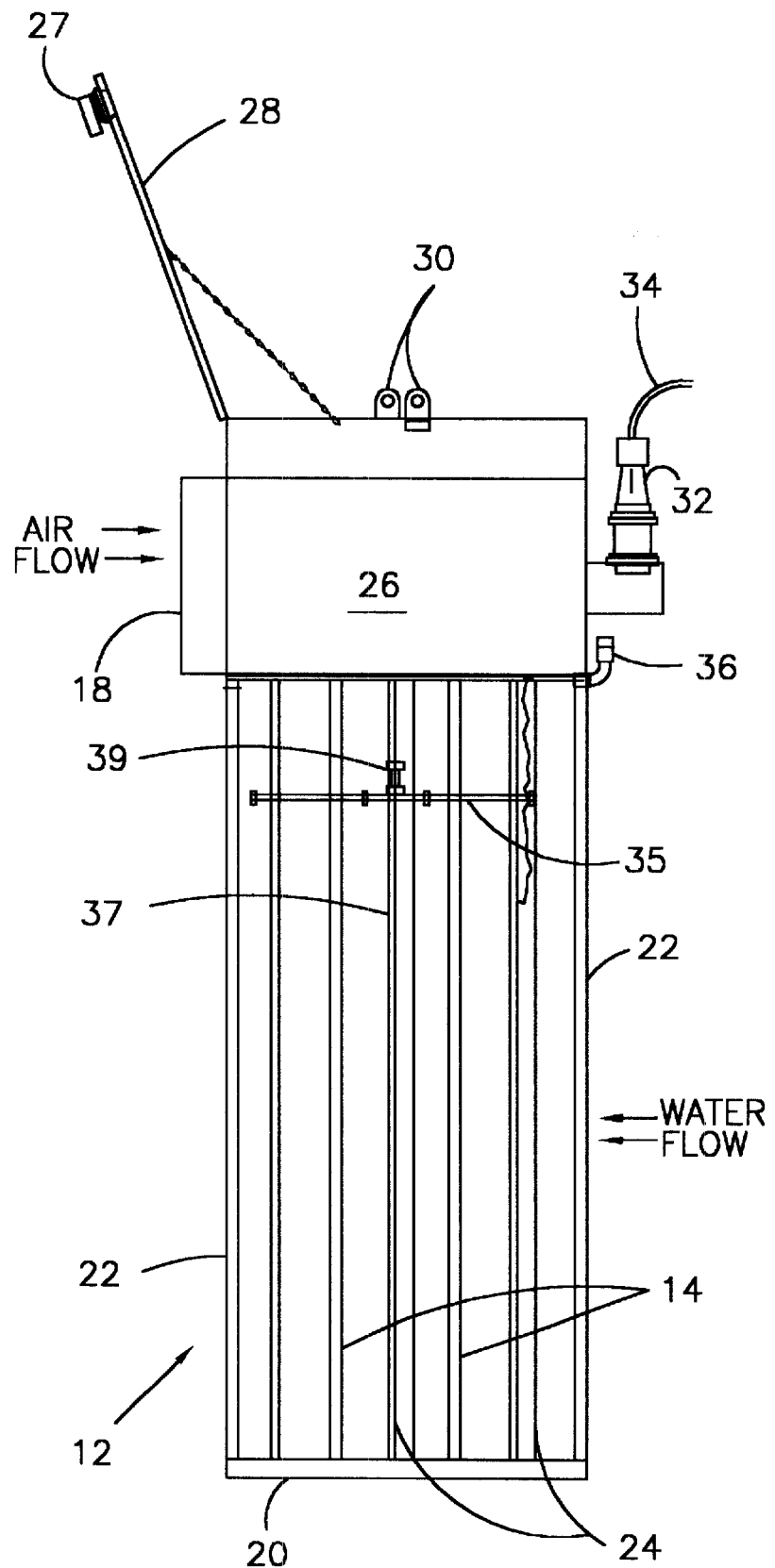
FIG. 2 is a side view of the module shown in FIG. 1.

Turning now to the drawings in general and FIGS. 1 and 2 in particular, the number 12 designates an immersible and portable disinfection module 12 which is typically located in an open channel (not shown) to irradiate wastewater with ultraviolet and thereby disinfect the water as it flows through the channel. Modules of this basic type are well known in the art such as those disclosed in U.S. Pat. No. 5,332,388, the subject matter of which is incorporated herein. Each module 12 includes a multiplicity of UV lamps 14 surrounded by transparent quartz jackets 24 located between an upper header 18 and a lower header 20 which in the embodiment shown are substantially vertically oriented in prearranged patterns to evenly and completely irradiate with a prescribed dose of ultraviolet and disinfect water as it passes through the channel. The modules typically rest on the floor of the channel and are positioned adjacent to substantially vertical walls.

The channel is typically sized so that wastewater passes lamps 14 in transparent jackets 24 and is maintained at a predetermined depth which preferably remains below upper header 18. The quantity, flow rate, type and composition of the water is effected by other systems and apparatus known in the art and not discussed herein.

The integral structure of module 12 includes an upper header 18 and lower header 20. Legs 22 connect upper and lower headers 18 and 20 and are preferably spaced apart at the respective corners of module 12. A multiplicity of transparent jackets 24 are connected between upper and lower headers 18 and 20 in a manner known well in the art. Each jacket 24 contains at least one lamp 14.

Upper header 18 includes sidewalls 26 and a removable cover 28. Cover 28 may be hinged or otherwise connectable to upper header 18 and is most preferably sealable to protect against water leakage. Handle 27 connects to cover 28 and ensures that cover 28 remains in a closed position during module operation. Raising and lowering eyes 30 are connected to sidewalls 26 for ease of location and are used to move module 12 in and out of the channel. Module 12 is equipped with an electrical connector 32 on one of sidewalls 26 which permits multiconductive cable 34 to connect between lamps and various power and control devices known in the art. Sidewall 24 also includes an air supply connector 36 to introduce air, which is the especially preferred fluid, for certain aspects of jacket cleaning, into module 12. Air supply connector 36 in sidewall 26 leads to an air supply pipe which is preferably located interiorly of the upper header 18. In an especially preferred embodiment, the air supply pipe connects to one of legs 22 which is hollow and channels air to lower header 20. Air may then be channeled outwardly of the channel through a multiplicity of holes (not shown) in lower header 20.

Upper header 18 contains wiring associated with lamps 14, electronic lamp controllers and/or ballasts, lamp monitors, data collectors and a number of devices not shown herein that contribute to the operation of the system and the module. Such devices include, among other things, connecting wires, coolant devices such as fans, blowers and the like as well as alarms, read-outs, microprocessors and the like. The need or desirability of these items is influenced by the particular characteristics of each treatment facility. Module 12 also contains a cleaning plate 35 which connects to a rotating screw 37, preferably an Acme screw, by way of a screw adapter 39 welded to cleaning plate 35.

Figure 3:
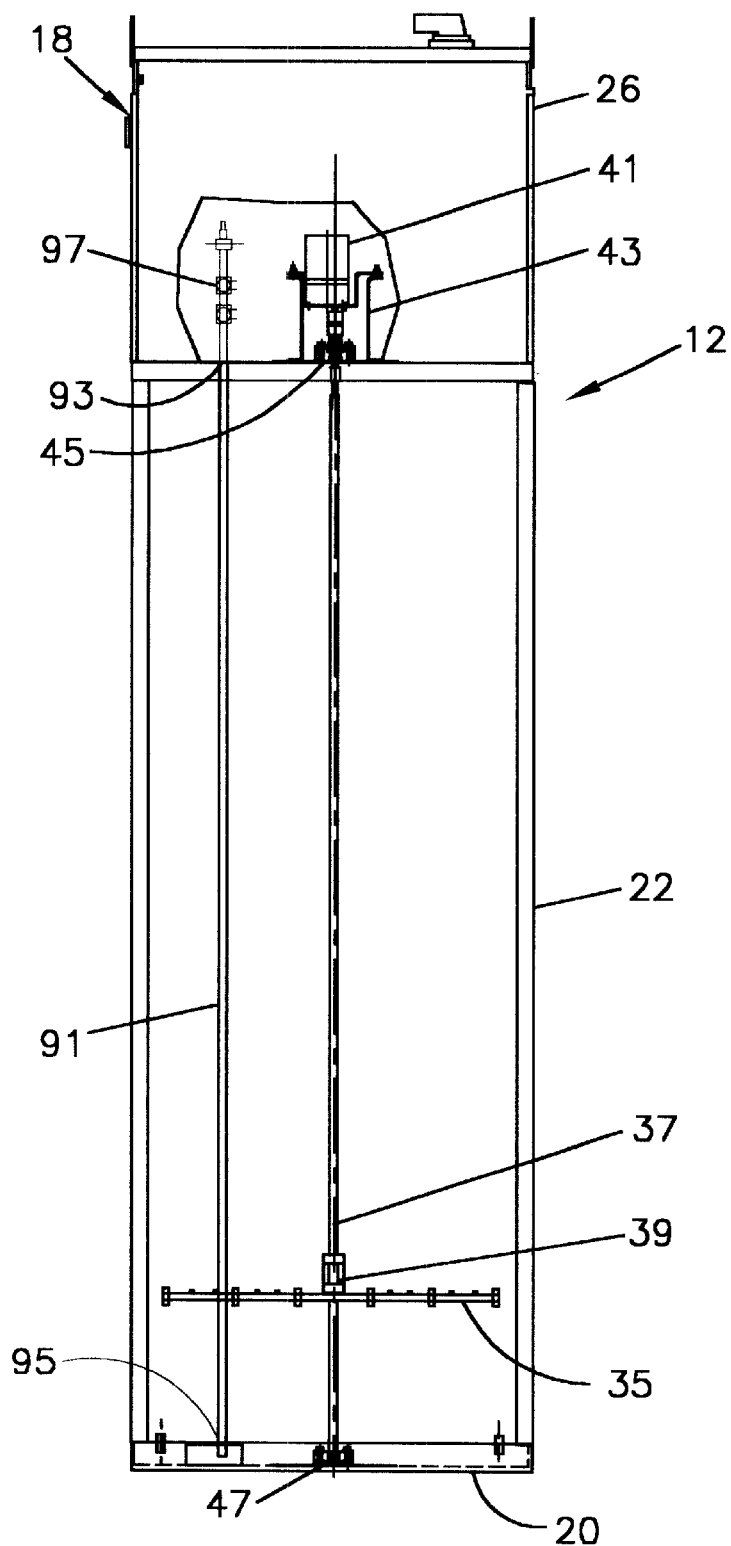
FIG. 3 is a side view of a portion of the module shown in FIG. 2, partially broken away and taken in section for ease of understanding.

FIG. 3 shows module 12 at a stage of intermediate assembly to facilitate ease of understanding of the cleaning system which comprises cleaner plate 35, rotating screw 37, screw adapter 39, motor 41, motor mount 43, upper screw mount 45 and lower screw mount 47. Motor 41 is connected to wires and control mechanisms to facilitate operation of the cleaning system. Actuation of motor 41 causes screw 37 to rotate between upper and lower screw mounts 45 and 47 to facilitate vertical movement of cleaning plate 35. Cleaning plate 35 has substantially a free range of movement between upper header 18 and lower header 20, such range being defined by a switch rod 91 that extends between headers 18 and 20.

Switch rod 91 has a stop device 93 adjacent header 18 and a stop device 95 adjacent header 20. Switch rod 91 connects to a switch mechanism 97 located in header 18 and adjacent motor 41. Switch 97 also electrically connects to motor 41.

Movement of cleaning plate 35 in the direction towards stop device 95 results in contact between stop device 95 and plate 35 inasmuch as switch rod 91 extends through an opening in plate 35 and stop device 95 is sized larger than the opening. Upon contact between plate 35 and stop device 95, movement of plate 35 towards header 20 causes switch rod 91 to move downwardly and, at a preselected point, trip switch 97. Trip switch 97 sends a signal to motor 41, thereby causing it to reverse direction. This causes plate 35 to move upwardly towards header 18. Cleaning plate 35 subsequently contacts stop device 93 adjacent header 18, thereby causing switch rod 91 to move upwardly toward header 18 and, at a preselected point, triggers switch 97. Switch 97 sends a signal to motor 41, thereby causing motor 41 to stop rotational movement. Initial movement of plate 35 and reverse movement of plate 35 constitutes a full cleaning cycle.

Figure 4:
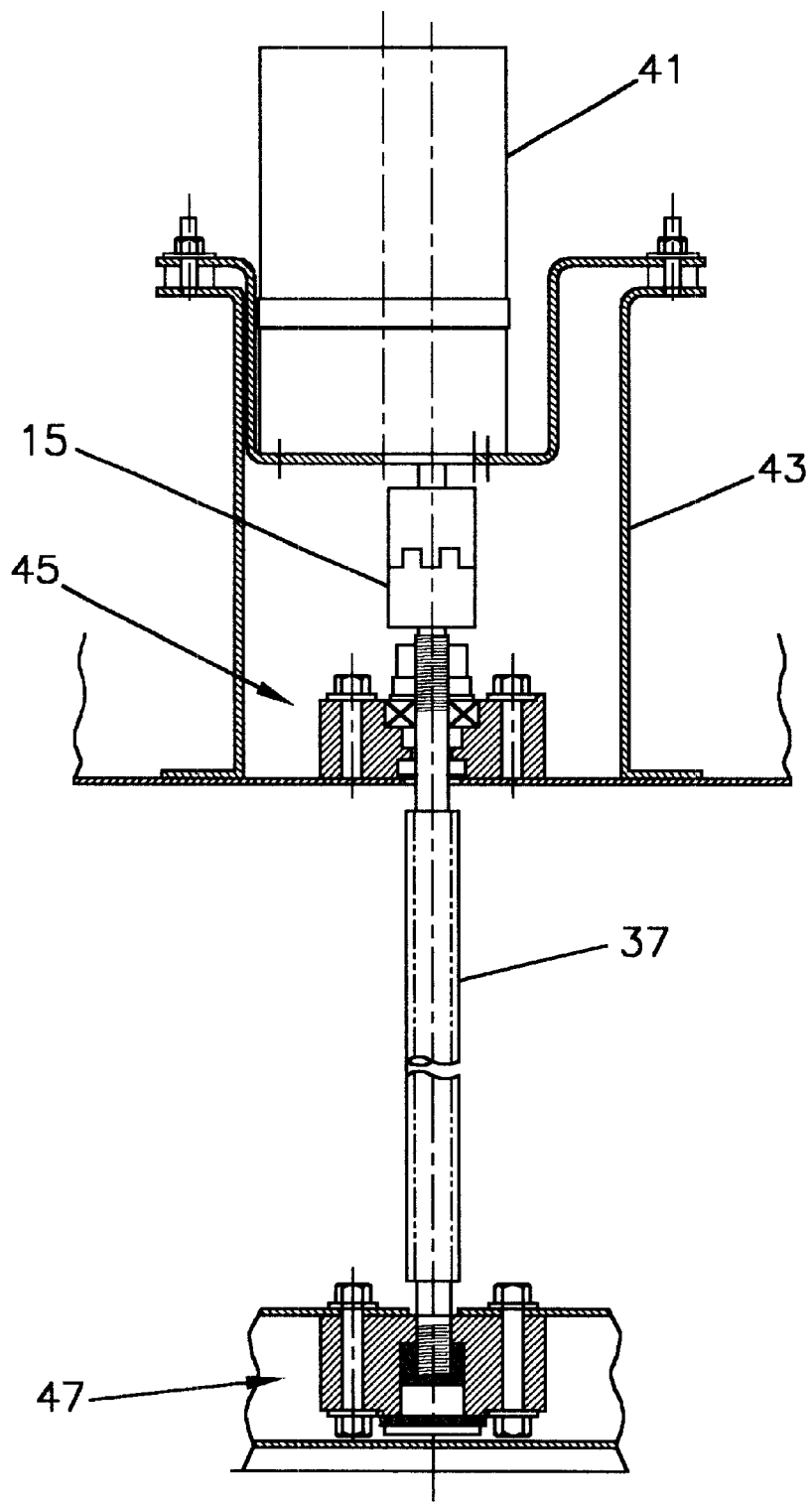
FIG. 4 is an exploded sectional view of a portion of the apparatus shown in FIG. 3.

FIG. 4 shows an exploded view of the structure to which rotating screw 37 is mounted. As previously noted, an upper portion of rotating screw 37 is fixed to upper screw mount 45 and the lower end of rotating screw 37 is fixed to lower screw mount 47. The particular structure of mounts 45 and 47 is not especially important so long as they hold rotating screw 37 in a substantially preselected vertical position and permit both clockwise and counterclockwise rotation of rotating screw 37. Also, in the case of lower screw mount 47, it should be constructed such that it can reliably operate over extended periods of time under water. Similarly, the construction of upper screw mount 45 must be such that rotating screw 37 may be connected to motor 41 either directly or through a coupling 15.

Figure 6:
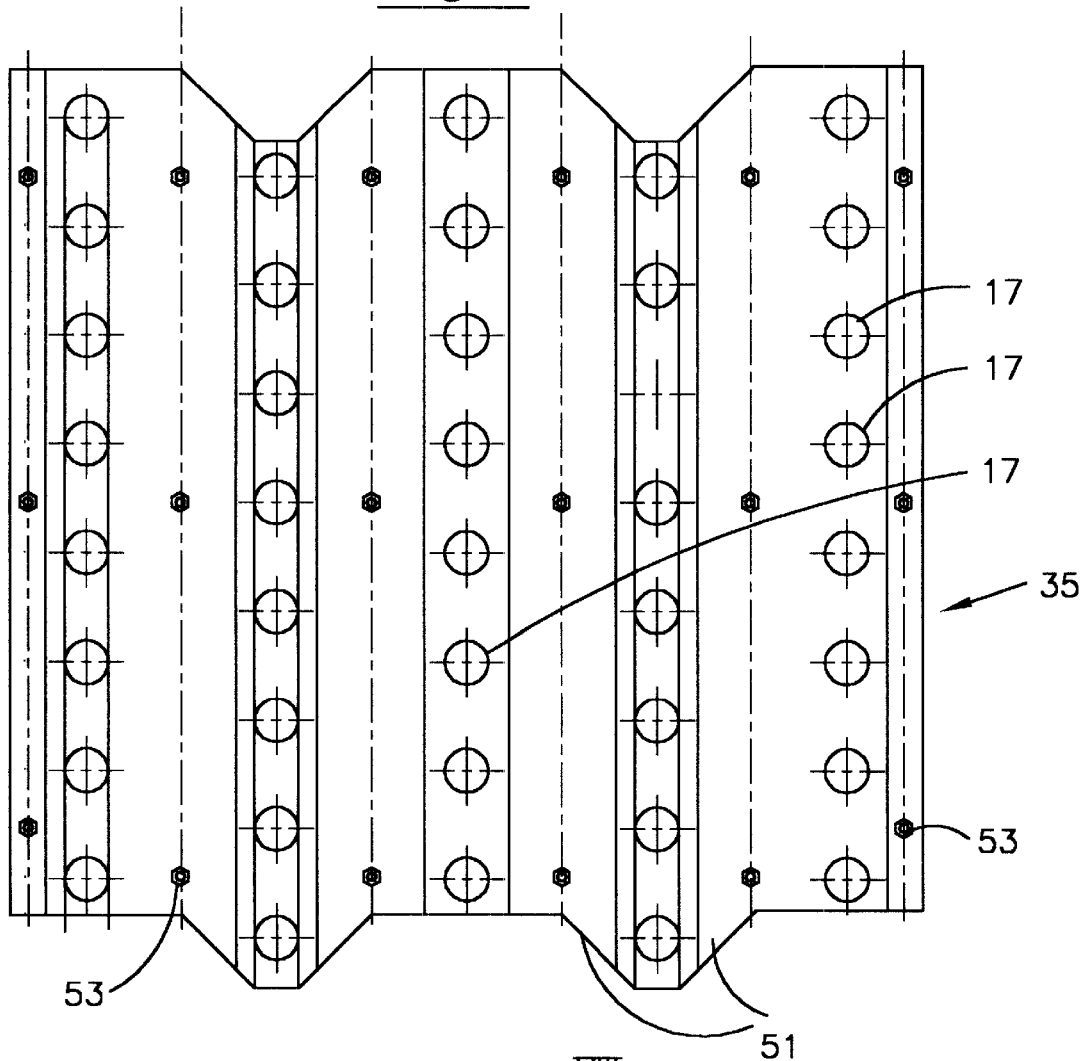
FIG. 6 is a top plan view of the plate shown in FIG. 5.
Figure 5:
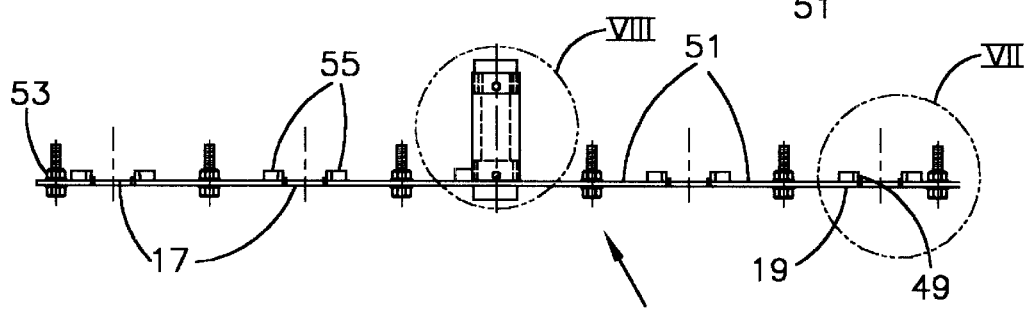
FIG. 5 is an exploded view of a cleaning plate in accordance with aspects of the invention as shown in FIG. 3.
Figure 7:
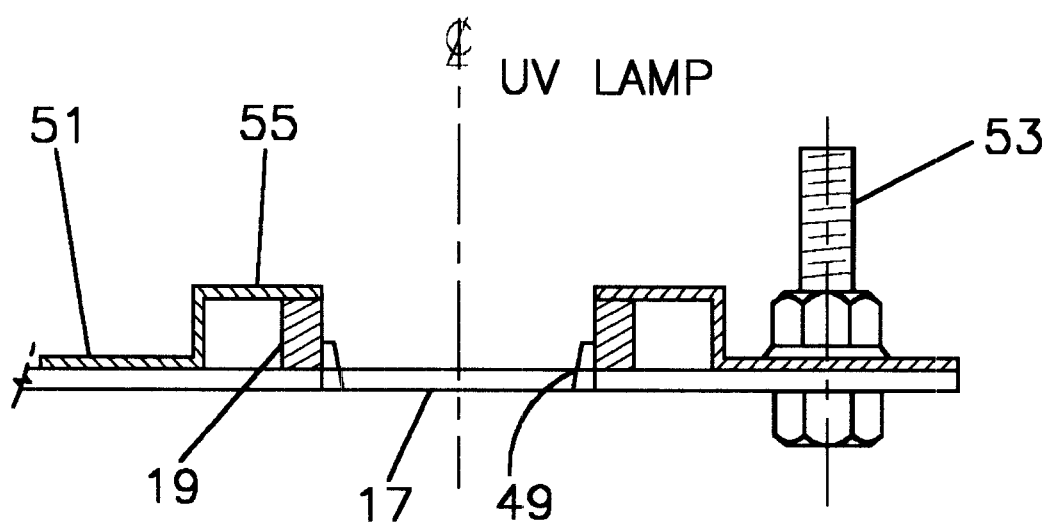
FIG. 7 is an exploded cross-sectional view of a portion of the cleaning plate taken from phantom line VII of FIG. 5.

FIGS. 5, 6 and 7 show further details of cleaning plate 35. Cleaning plate 35 contains a multiplicity of openings 17 which substantially correspond in location to the placement of lamps 14 and jackets 24 within module 12. It is important to note, however, that there are oftentimes significant variations in tolerances between the location of jackets 24 and the location of the openings 17. Each opening 17 is matched to a ring 19 that is preferably made from hard plastic and has a lip seal 49, preferably made from elastic-type material such as rubber. A pair of clamp plates 51 holds each ring 19 in a designated location. The plates 51 are held in place by a multiplicity of nut/bolt combinations 53.

Each plate 51 has a "Z" shaped portion 55 which, together with the edge portions of plate 35 at openings 17, sandwich rings 19 in place. The "Z" portions permit a small amount of lateral movement of rings 19 to accommodate for the tolerance variations with respect to the positioning of jackets 24. There is no substantial vertical movement of rings 19 permitted by the "Z" shaped portions. Lip seals 49 are sized and shaped to contact jackets 24 so that, during sliding action of plate 35 with respect to jackets 24, cleaning action of jackets 24, by virtue of such physical contact, occurs.

FIG. 8 shows screw adapter 39 which is comprised of a substantially cylindrical tube 71 welded to cleaning plate 35 at an opening 73 in plate 35. Tube 71 has openings on each end thereof, each opening containing a thread nut 75. Each thread nut 75 has a central bore extending therethrough, the central bore having a threaded surface 77 which engages threads 79 of screw 37. The thread nuts 75 are attached to an interior surface 81 of tube 71 by threads 83 by way of threads 85 on thread nuts 75. A set screw 87 fixes each thread nut 75 into a desired position relative to cylinder 71.

Rotation of screw 37 in a particular direction causes cleaning plate 35 to move between headers 18 and 20 in a selected direction. Reversal of the direction of rotation of screw 37 causes reversal of the direction of movement of cleaning plate 35 between headers 18 and 20.

In accordance with the structure described above, the operator can clean lamp jackets 24 at intervals particular to the characteristics of the system in which the cleaning apparatus is installed. The cleaning system can be used on an automated system if desired or operated manually and such automation can be adjusted in accordance with water quality, water flow and any number of other variables.

The benefits brought about by the structure described above include: head losses are limited since plate 35 remains submerged during the operation of the module; during normal operation, the cleaning system is located above the electrodes of lamps 14, whereby their total arc length remains effective; lip seals 49 are not continuously exposed to UV radiation inasmuch as the cleaning system is stored above the lamp electrodes during normal operation; no algae and/or fibers are trapped by plate 35 inasmuch as the cleaning system is stored above the water level during normal operation; fibers and algae that might be trapped on screw 37 are removed each time cleaning plate 35 is cycled; and reduced maintenance of screw adapter 39 occurs due to the double thread nut design. Accordingly, the cleaning system can be used for not only wastewater disinfection, but for drinking water disinfection as well.

Although this invention has been described in connection with specific forms thereof, it will be appreciated that a wide variety of equivalents may be substituted for the specific elements described herein without departing from the spirit and scope of this invention described in the appended claims. For example, the upper and lower headers 18 and 20 need not be totally vertically aligned so that the lamps are perpendicular to the headers. The upper and lower headers can be arranged so that the lamps are aligned out of vertical. For example, the lamps may extend between the headers at various angles to vertical such as horizontal.

Modules 12 may be connected to various types of power and control devices. The power supply is typically found at the site and is preferably a standard commercial building type, although modules 12 may be connected to alternate supplies such as generators and the like. Modules 12 are preferably connected to function control devices that coordinate operation of the entire disinfection system, including the cleaning function. One particular control function allows modules 12 to automatically, either continuously or periodically, initiate or terminate cleaning by operating a time device, water flow rates, quantities and the like, and an alarm system, for example.

Modules 12 are most preferably constructed from stainless steel and welded together, although other materials and assembly methods may be substituted or added. Also, the modules can not only be installed in vertical and horizontal format, but in open channel and closed configurations.

What is claimed is:

1. A cleaning system for a UV disinfection module having a pair of headers with a multiplicity of lamps extending therebetween comprising:

a cleaning plate having a multiplicity of openings therein, the openings having lamp wipers, the openings and the wipers arranged to substantially coincide with positions of the lamps to permit movement of the plate between the headers;

a rotatable screw extending between the headers and through the plate;

a motor operatively connected to rotate the screw;

a screw adapter fixed to the cleaning plate at a rotatable screw opening in the plate and including 1) a substantially cylindrical tube having opposed openings, one of the openings being aligned with the rotatable screw opening and 2) a thread nut connected to each of the opposed openings, each opposed opening having a threaded central bore sized to threadingly engage threads on the rotatable screw, whereby rotation of the screw moves the cleaning plate between the headers.

2. The apparatus of claim 1, further comprising a pair of set screws extending through the tube at locations to engage the respective thread nuts and fix the thread nuts in selected positions.

3. The apparatus of claim 1, wherein the thread nuts threadingly engage an interior threaded surface of the tube.

4. The apparatus of claim 1, wherein the tube is welded to the cleaning plate.

5. The apparatus of claim 1, further comprising a switch rod extending between the headers, the switch rod having stop devices located adjacent each header and a switch connected to the motor, whereby contact of the cleaning plate with one stop device trips the switch and causes the motor to reverse and contact of the cleaning plate with another of the stop devices trips the switch and causes the motor to shut off.

6. The apparatus of claim 1, wherein the switch rod extends through an opening in the cleaning plate.

7. The apparatus of claim 1, wherein the wipers comprise a hard plastic ring and an elastic or low friction lip seal connected on an interior surface thereof.

8. The apparatus of claim 1, wherein each wiper is held in position by a pair of mounting plates connected to the cleaning plate.

9. The apparatus of claim 1, wherein the mounting plates permit lateral movement of each wiper, but prevent vertical movement of each wiper.

10. A UV disinfection module comprising:

a pair of headers;

a multiplicity of UV lamps oriented substantially parallel to each other extending between and mounted to the headers;

a cleaning plate having a multiplicity of openings therein, the openings having lamp wipers, the openings and the wipers arranged to substantially coincide with positions of the lamps to permit movement of the plate between the headers;

a rotatable screw extending between the headers and through the plate;

a motor operatively connected to rotate the screw;

a screw adapter fixed to the cleaning plate at a rotatable screw opening in the plate and including 1) a substantially cylindrical tube having opposed openings, one of the openings being aligned with the rotatable screw opening and 2) a thread nut connected to each of the opposed openings, each opposed opening having a threaded central bore sized to threadingly engage threads on the rotatable screw, whereby rotation of the screw moves the cleaning plate between the headers.

11. The apparatus of claim 10, further comprising a switch rod extending between the headers, the switch rod having stop devices located adjacent each header and a switch connected to the motor, whereby contact of the cleaning plate with one stop device trips the switch and causes the motor to reverse and contact of the cleaning plate with another of the stop devices trips the switch and causes the motor to shut off.

12. The apparatus of claim 10, wherein the switch rod extends through an opening in the cleaning plate.

13. The apparatus of claim 10, further comprising a pair of set screws extending through the tube at locations to engage the respective thread nuts and fix the thread nuts in selected positions.

14. The apparatus of claim 10, wherein the thread nuts threadingly engage an interior threaded surface of the tube.

15. A cleaning system for a UV disinfection module having a pair of headers with a multiplicity of lamps extending therebetween comprising:

a cleaning plate having a multiplicity of openings therein, the openings arranged to substantially coincide with positions of the lamps to permit movement of the plate between the headers;

a ring-shaped wiper connected to the plate at each opening sized such that each wiper has a diameter less than the exterior diameter of a corresponding lamp, each wiper connected to the plate to permit lateral movement of the wiper with respect to the plate; and a motor operatively connected to move the plate between the headers.

16. The apparatus of claim 15, wherein the wipers comprise a hard plastic ring and an elastic or low friction lip seal connected on an interior surface of the ring.

17. The apparatus of claim 15, wherein each wiper is held in position by a pair of mounting plates connected to the cleaning plate.

18. The apparatus of claim 17, wherein the mounting plates permit lateral movement of each wiper, but prevent vertical movement of each wiper.

19. A UV disinfection module comprising:

a pair of headers;

a multiplicity of UV lamps oriented substantially parallel to each other extending between and mounted to the headers;

a cleaning plate having a multiplicity of openings therein, the openings arranged to substantially coincide with positions of the lamps to permit movement of the plate between the headers;

a ring-shaped wiper connected to the plate at each opening sized such that each wiper has a diameter less than the exterior diameter of a corresponding lamp, each wiper connected to the plate to permit lateral movement of the wiper with respect to the plate; and a motor operatively connected to move the plate between the headers.

20. The apparatus of claim 19, further comprising a switch rod extending between the headers, the switch rod having stop devices located adjacent each header and a switch connected to the motor, whereby contact of the cleaning plate with one stop device trips the switch and causes the motor to reverse and contact of the cleaning plate with another of the stop devices trips the switch and causes the motor to shut off.

21. The apparatus of claim 19, further comprising a screw adapter fixed to the cleaning plate at a rotatable screw opening in the plate and including 1) a substantially cylindrical tube having opposed openings, one of the openings being aligned with the rotatable screw opening and 2) a thread nut connected to each of the opposed openings, each opposed opening having a threaded central bore sized to threadingly engage threads on the rotatable screw, whereby rotation of the screw moves the cleaning plate between the headers.

22. The apparatus of claim 1, wherein the cleaning plate comprises a pair of spaced apart substantially parallel subplates and each wiper is held in position between the subplates.

23. A cleaning system for a UV disinfection module having a pair of headers with a multiplicity of lamps extending therebetween comprising:

a cleaning plate having a multiplicity of openings therein, the openings having lamp wipers, the openings and the wipers arranged to substantially coincide with positions of the lamps to permit movement of the plate between the headers;

a rotatable screw extending between the headers and through the plate;

a motor operatively connected to rotate the screw;

a screw adapter fixed to the cleaning plate at a rotatable screw opening in the plate and including 1) an adaptor plate spaced apart from the cleaning plate and substantially parallel to the cleaning plate and having an opening aligned with the rotatable screw opening, 2) a thread nut connected to the adaptor plate at the opening in the adaptor plate, and 3) a thread nut connected to the cleaning plate and being aligned with the adaptor plate opening and a screw opening in the cleaning plate, each thread nut having a threaded central bore sized to threadingly engage threads on the rotatable screw, whereby rotation of the screw moves the cleaning plate between the headers.

\* \* \* \* \*